3,005,837
2α-METHYL - 21 - HALO - 11 - OXYGENATED 4-
PREGNE-3,20-DIONES AND THE INTERME-
DIATES IN THE PREPARATION THEREOF
Frank H. Lincoln, Jr., Kalamazoo, and William P.
Schneider, Kalamazoo Township, Kalamazoo County,
Mich., assignors to The Upjohn Company, Kalamazoo,
Mich., a corporation of Michigan
No Drawing. Filed Sept. 23, 1957, Ser. No. 685,375
7 Claims. (Cl. 260—397.45)

This invention relates to novel steroids and to a process for their production and is more particularly concerned with compounds of the following formula:

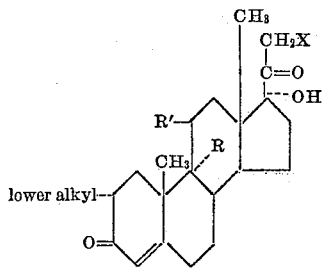

wherein X is a halogen atom, R is hydrogen or a halogen atom, R' is hydroxy or keto, and the lower-alkyl radical contains from one to eight carbon atoms, inclusive.

The novel compounds of the present invention and the process for their production may be represented as follows:

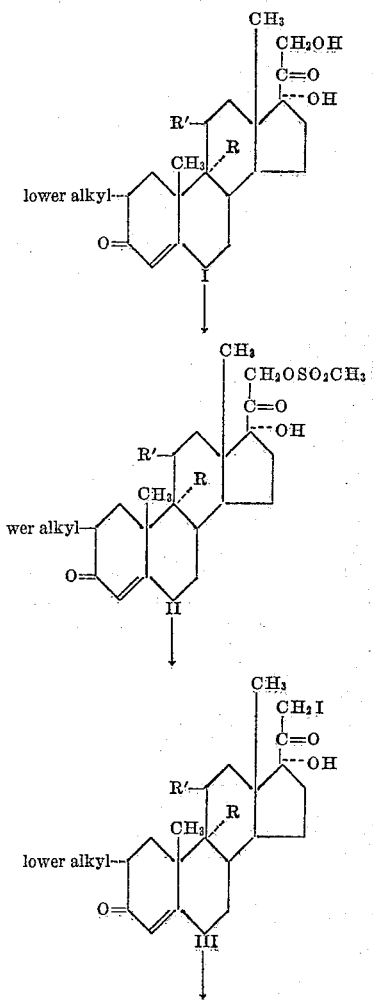

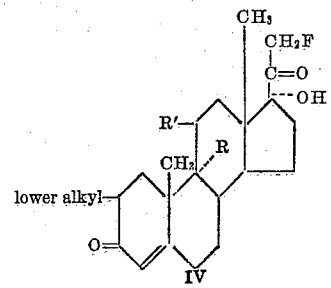

wherein R is hydrogen or halogen, R' is hydroxy or keto, and the lower-alkyl radical contains from one to eight carbon atoms, inclusive.

It is an object of the present invention to provide the novel 2α - lower-alkyl-21-halo-11-oxygenated-4-pregnene-3,20-diones and the 9α-halo derivatives thereof as shown above. It is a further object of this invention to provide a process for producing the aforementioned compounds. An additional object is the preparation of 2α-methyl-21-fluoro-11β,17α-dihydroxy - 4 - pregnene-3,20-dione, 2α-methyl-21-fluoro-17α-hydroxy-4-pregnene - 3,11,20-trione, and the 9α-fluoro derivatives thereof. Other objects will be apparent to those skilled in the art to which this invention pertains.

The novel compounds described and claimed herein possess valuable pharmacological activity, in particular mineralocorticoid, glucocorticoid, and anti-inflammatory activities. They are useful as compositions or mixtures, e.g., as stable suspensions or in readily suspendible form to be injected for the treatment of rheumatoid ailments of the animal organism. These compounds can be administered orally or employed in topical preparations such as ointments, creams, and lotions for the treatment of inflamatory conditions of the skin, eyes, ears and the like.

Broadly described, the process of the present invention comprises treating a 2α-lower-alkyl-11-oxygenated-17α,21-dihydroxy-4-pregnene-3,20-dione with an organic acid sulfonyl chloride to give the corresponding 2α-lower-alkyl-21 - halo - 11 - oxygenated - 17α-hydroxy-4-pregnene-3,20-dione 21-organic acid sulfonate, thereafter heating the 21-organic acid sulfonate with an alkali metal iodide to obtain the corresponding 2α-lower-alkyl-21-iodo-11-oxygenated-17α-hydroxy-4-pregnene-3,20-dione, and, finally, reacting the 21-iodo steroid with a fluorinating agent such as silver fluoride to yield the corresponding 2α-lower-alkyl-21-fluoro-11-oxygenated-17α-hydroxy-4-pregnene-3,20-dione.

More particularly described, the novel process for producing the compounds of the present invention comprises, first, the reaction of a 2α-lower-alkyl-9α-halo-11-oxygenated-17α,21-dihydroxy-4-pregnene- 3,20 - dione (I) with methanesulfonyl chloride in pyridine to form 2α-lower-alkyl-9α-halo-11-oxygenated-17α,21 - dihydroxy - 4-pregnene-3,20-dione 21-methanesulfonate (II). The latter compound is then treated with sodium iodide in acetone to give 2α-lower-alkyl-9α-halo-21-iodo - 11 - oxygenated-17α-hydroxy-4-pregnene-3,20-dione (III). The 21-iodo compound is then converted by reaction with silver fluoride in acetonitrile to the 2α-methyl-9α-halo-21-fluoro-11-oxygenated-17α-hydroxy-4-pregnene-3,20-dione (IV).

The starting 2α-lower-alkyl-11-oxygenated-17α,21-dihydroxy-4-pregnene-3,20-dione (I) and the 9α-halo derivatives thereof, as well as the corresponding 11-keto compounds, are prepared in accordance with the method of Hogg et al. as described in the Journal of the American Chemical Society, 77, 6401 (1955). The starting steroid is esterified with an organic sulfonic acid such as methanesulfonyl chloride, toluenesulfonyl chloride, benzenesulfonyl chloride, substituted benzenesulfonyl chloride, such as ortho-, meta-, or para-chlorobenzenesulfonyl chloride, the ortho-, meta-, or para-nitrobenzenesulfonyl chloride, benzenesulfonyl chlorides substituted by other halo, nitro, methoxy, ethoxy, and like groups, methanesulfonyl chloride being preferred. The esterification is carried out in solution using pyridine or neutral solvents such as benzene, toluene, chloroform or the like as the solvent. The organic acid-sulfonyl chloride is employed in a ratio of 1–1.2 moles of organic sulfonyl halide to one mole of steroid. Smaller or larger proportions of reagent may be used and are operative but the ratio specified above is preferred. The organic sulfonyl chloride is generally added dropwise or otherwise slowly into a reaction mixture consisting of the starting steroid dissolved in a solvent such as methylene chloride, benzene, chloroform, carbon tetrachloride, or the like, while stirring the reaction mixture and maintaining the same at reduced temperatures, such as, for example, from about minus twenty to plus ten degrees centigrade. After the organic sulfonic acid halide has been added, the reaction mixture is refrigerated to between minus twenty and plus ten degrees centigrade for a period of between one and 48 hours. Thereafter the product, a 2α-lower-alkyl-11-oxygenated-17α,21-dihydroxy-4-pregnene-3,20-dione 21-organic sulfonate (II), or the corresponding 9α-halo derivative, is isolated by conventional means, such as by pouring the reaction mixture into an excess of water, extracting with an organic solvent immiscible with water, such as benzene, chloroform, or the like, followed by drying the organic layer containing the steroid, evaporating the solvent therefrom and purifying the residue by recrystallization, chromatography, or the like. For the subsequent reaction the 21-organic acid sulfonate can either be purified or used in the crude form.

The 21-organic acid sulfonate (II) is dissolved in an organic solvent such as acetone and then treated with an excess of alkali metal iodide, usually from two to five moles of sodium, potassium or lithium iodide per mole of steroid. The reaction mixture is heated with constant stirring for a period of from five to sixty minutes and is then evaporated at reduced pressure. The thus obtained 21-iodo steroid can be employed in the subsequent reaction either in the purified form as a product of recrystallization from such organic solvents as acetone, ethanol, methanol, Skellysolve B (hexane hydrocarbons), or the like, or it can be used in the crude state.

The 21-iodo steroid (III) dissolved in a solvent such as acetonitrile, dimethylformamide or ethylene glycol is treated with silver fluoride, antimony fluoride or the like, acetonitrile and silver fluoride, respectively, being preferred. The alkali halide then should be added in small quantities at intervals, and the reaction mixture should be protected from light during the reaction period, which usually ranges from one-half to six hours. The reaction mixture is then concentrated and the product extracted as in the previous steps to yield essentially pure 2α-lower-alkyl-21-fluoro-11-oxygenated-17α,21-dihydroxy-4-pregnene-3,20-dione (IV) or the 9α-fluoro derivatives thereof.

The following examples are illustrative of the process and products of the present invention but are not to be construed as limiting.

PREPARATION 1

2α-methyl-11β,17α,21-trihydroxy-4-pregnene-3,20-dione 21-methanesulfonate (2α-methylhydrocortisone 21-methanesulfonate) (II)

A solution of 5.00 grams (13.2 millimoles) of 2α-methyl-11β,17α,21-trihydroxy-4-pregnene-3,20-dione (I) in twenty milliliters of pyridine was cooled to zero degrees centigrade and 1.6 milliliters of methanesulfonyl chloride slowly added. After the mixture was held for a period of four hours at zero to five degrees centigrade, ice and dilute hydrochloric acid sufficient to neutralize the pyridine were added and the mixture extracted with methylene chloride. The extract was washed with cold sodium bicarbonate solution, dried over sodium sulfate and evaporated at reduced pressure. A yield of 5.69 grams (96 percent of theoretical) of a gummy product was obtained which crystallized from acetone-Skellysolve B (hexane hydrocarbons) in large prisms melting at 184 to 186 degrees centigrade (with decomposition). The product analyzed as follows:

Calculated for $C_{23}H_{34}O_7S$: S, 7.34. Found: S, 6.93.

PREPARATION 2

2α-methyl-17α,21-dihydroxy-4-pregnene-3,11,20-trione 21-methanesulfonate (2α-methylcortisone 21-methanesulfonate) (II)

In the same manner as indicated in Preparation 1 but substituting 2α-methyl-17α,21-dihydroxy-4-pregnene-3,11,20-trione (I) as the starting material, there is produced the corresponding 11-keto steroid product, 2α-methyl-17α,21-dihydroxy-4-pregnene-3,11,20-trione 21-methanesulfonate.

PREPARATION 3

2α-methyl-9α-fluoro-11β,17α,21-trihydroxy-4-pregnene-3,20-dione 21-methanesulfonate (2α-methyl-9α-fluorohydrocortisone 21-methanesulfonate) (II)

A solution of 3.00 grams (7.9 millimoles) of 2α-methyl-9α-fluoro-11β,17α,21-trihydroxy-4-pregnene-3,20-dione (I) in forty milliliters of pyridine was cooled to zero degrees centigrade and treated with 1.2 grams (10.2 millimoles) of methanesulfonyl chloride. After 72 hours at zero to five degrees centigrade, iced aqueous hydrochloric acid was added in quantities sufficient to neutralize the pyridine, and the mixture was then extracted with methylene chloride. The extract was washed with sodium bicarbonate solution followed by water and dried over sodium sulfate. Evaporation at reduced pressure gave 2.90 grams of a partly crystalline residue consisting essentially of 2α-methyl-9α-fluoro-11β,17α,21-trihydroxy-4-pregnene-3,20-dione 21-methanesulfonate.

PREPARATION 4

2α-methyl-9α-fluoro-17α,21-dihydroxy-4-pregnene-3,11,20-trione 21-methanesulfonate (2α-methyl-9α-fluoro-21-desoxycortisone 21-methanesulfonate) (II)

Following the procedure of Preparation 3 but substituting 2α-methyl-9α-fluoro-17α,21-dihydroxy-4-pregnene-3,11,20-trione (I) as the starting material, there is produced the corresponding 11-keto steroid, 2α-methyl-9α-fluoro-17α,21-dihydroxy-4-pregnene-3,11,20-trione 21-methanesulfonate (II).

Following the procedures of Preparations 1, 2, 3, and 4, and substituting other 2α-lower-alkyl-11-oxygenated-17α,21-dihydroxy-4-pregnene-3,20-ketones or their 9α-halo analogs or the corresponding 2α-aryl-substituted compounds; the corresponding 2α-substituted-11-oxygenated-17α,21-dihydroxy-4-pregnene-3,20-dione 21-methanesulfonates, benzenesulfonates, toluenesulfonates, β-naphthylsulfonates, and the like, are produced wherein the 2α-substituted group is methyl, ethyl, propyl, isopropyl, butyl, isobutyl, pentyl, hexyl, benzyl, phenyl, etc., wherein the 9α-position is substituted either by hydrogen or a halogen atom, and wherein the 11-substituent is hydroxy or keto.

EXAMPLE 1

2α-methyl-21-iodo-11β,17α-dihydroxy-4-pregnene-3,20-dione (2α-methyl-21-iodo-21-desoxyhydrocortisone) (III)

A solution of 5.00 grams (11.0 millimoles) of 2α-methyl-11β,17α,21-trihydroxy-4-pregnene-3,20-dione 21-methanesulfonate (II) in 100 milliliters of acetone was treated with a solution of 5.0 grams of sodium iodide in fifty milliliters of acetone and the resulting mixture distilled for a period of fifteen minutes at atmospheric pressure. At this point, the mixture had been concentrated to approximately one-third its original volume and was thick with a gelatinous-type precipitate. Ice and 400 milliliters of water were added with stirring. The product was collected on a filter, washed with water and dried at room temperature. A yield of 4.82 grams (90.2 percent of theoretical) of yellowish crystals melting at 138 to 140 degrees centigrade (with decomposition) was obtained. A portion was recrystallized from acetone-water, giving colorless prisms melting indefinitely at 138 to 142 degrees centigrade (with decomposition). Analysis was as follows:

Calculated for $C_{22}H_{31}O_4I$: I, 25.75. Found: I, 25.83.

EXAMPLE 2

$2\alpha$-methyl-21-iodo-17$\alpha$-hydroxy-4-pregnene-3,11,20-trione ($2\alpha$-methyl-21-iodo-21-desoxycortisone) (III)

Following the procedure of Example 1 but substituting $2\alpha$-methyl-17$\alpha$,21-dihydroxy-4-pregnene-3,11,20-trione 21-methanesulfonate (II) as the starting material is productive of the corresponding 11-keto steroid, $2\alpha$-methyl-21-iodo-17$\alpha$-hydroxy-4-pregnene-3,11,20-trione (III).

EXAMPLE 3

$2\alpha$-methyl-9$\alpha$-fluoro-21-iodo-11$\beta$,17$\alpha$ - dihydroxy-4-pregnene-3,20-dione ($2\alpha$-methyl - 9$\alpha$ - fluoro-21-iodo-21-desoxyhydrocortisone) (III)

A solution of 2.50 grams (5.29 millimoles) of $2\alpha$-methyl-9$\alpha$-fluoro-11$\beta$,17$\alpha$,21 - trihydroxy-4-pregnene-3,20-dione 21-methanesulfonate (II) in fifty milliliters of acetone was treated with a solution of 2.50 grams of sodium iodide in fifty milliliters of acetone. The mixture was boiled with stirring for fifteen minutes, at which time the volume of the mixture was found to have been reduced by about one-half. Ice and water were added, and the resulting crystalline product was washed with water and air dried. A yield of 1.89 grams (71 percent of theoretical) of product melting at 161 to 163 degrees centigrade (with decomposition) was obtained. Analysis was as follows:

Calculated for $C_{22}H_{30}O_4FI$: I, 25.16. Found: I, 22.74.

EXAMPLE 4

$2\alpha$-methyl-9$\alpha$ - fluoro-21-iodo-17$\alpha$-hydroxy-4-pregnene-3,11,20-trione ($2\alpha$ - methyl-9$\alpha$-fluoro-21-iodo-21-desoxycortisone) (III)

In the same manner as in Example 3 but substituting as the starting material $2\alpha$-methyl-9$\alpha$-fluoro-17$\alpha$,21-dihydroxy-4-pregnene-3,11,20-trione 21-methanesulfonate (II) there is produced the corresponding 11-keto steroid, $2\alpha$ - methyl-9$\alpha$-fluoro-21-iodo-17$\alpha$-hydroxy-4-pregnene-3, 11,20-trione (III).

Following the procedures of Examples 1, 2, 3, and 4, and substituting other $2\alpha$-substituted-9$\alpha$-halo-17$\alpha$-21-dihydroxy-11-oxygenated-4-pregnene-3,20-dione 21-methanesulfonates, the corresponding $2\alpha$-substituted-9$\alpha$-halo-21-iodo - 11 - oxygenated - 17$\alpha$ - hydroxy - 4 - pregnene-3,20-diones are produced wherein the $2\alpha$-substituent is methyl, ethyl, propyl, isopropyl, butyl, isobutyl, pentyl, hexyl, benzyl, phenyl, etc., wherein the 9$\alpha$-position is hydrogen or halogen and the 11-substituent is hydroxy or keto. In like manner, the corresponding 21-bromo and 21-chloro steroids can be produced by reaction of the steroid 21-sulfonate with the appropriate alkali halide.

EXAMPLE 5

$2\alpha$ - methyl - 21 - fluoro - 11$\beta$,17$\alpha$ - dihydroxy - 4 - pregnene - 3,20 - dione ($2\alpha$ - methyl - 21 - fluoro - 21-desoxyhydrocortisone) (IV)

A solution of 4.50 grams (9.26 millimoles) of $2\alpha$-methyl - 21 - iodo - 11$\beta$,17$\alpha$ - dihydroxy - 4 - pregnene-3,20-dione (III) in 500 milliliters of acetonitrile was warmed to forty degrees centigrade with stirring and treated with three milliliters of a fifty-percent aqueous solution of silver fluoride. A yellowish brown precipitate developed which rapidly turned dark brown. The flask was wrapped with a dark cloth to protect the contents from light, and stirring was continued for thirty minutes. Additional silver fluoride solution was then added in three 2-milliliter portions at thirty-minute intervals. Stirring was continued while the reaction mixture was maintained at approximately forty degrees centigrade to a total reaction time of four hours. The mixture was then concentrated to a syrup at reduced pressure and extracted with three 125-milliliter portions of warm methylene chloride and three 125-milliliter portions of warm acetone. Evaporation of the acetone yielded 1.29 grams of gray crystals. The combined methylene chloride extract was chromatographed on 200 grams of Florisil (magnesium silicate). The column was eluted with 1500 milliliters of ten percent acetone-ninety percent Skellysolve B, 2400 milliliters of 12.5 percent acetone-87.5 percent Skellysolve B, 3000 milliliters of fifteen percent acetone-85 percent Skellysolve B, 1200 milliliters of twenty percent acetone-eighty percent Skellysolve B, and 300 milliliters of acetone. The eluate was collected in 300-milliliter fractions and evaporated. Fractions 6 through 26 contained 0.99 gram of a crystalline material which was combined with the aforementioned 1.29 grams of gray crystals from the acetone extract and recrystallized twice from acetone to give two crops of crystals. The first crop consisted of 0.88 gram of crystals melting at 244 to 247 degrees centigrade (with decomposition), the second crop of 0.39 gram melting at 238 to 243 degrees centigrade (with decomposition). Crystals of both crops had previously undergone darkening. A portion of the first crop was recrystallized from methyl alcohol-acetone to give diamond-like crystals melting at 250 to 258 degrees centigrade (with decomposition). The following were obtained on analysis: $\alpha_D$ plus 175 degrees (pyridine);

$\lambda_{maximum}^{alcohol}$ 240 millimicrons $a_M$ 15,775.

Calculated for $C_{22}H_{31}O_4F$: C, 69.81; H, 8.26; F, 5.02. Found: C, 69.73; H, 8.88; F, 5.18.

Fractions 2 through 4 from the above column contained 847 milligrams of a byproduct which recrystallized from acetone-Skellysolve B as long needles melting at 149 to 151 degrees centigrade in a yield of 0.60 gram. This material on further study was found to exhibit a raised carbonyl bond in the infrared at 1803 centimeters$^{-1}$, indicative of a carbonyl contained in a four-membered ring. Analysis and structure were as follows:

Calculated for $C_{22}H_{30}O_4$: C, 73.71; H, 8.44. Found: C, 73.81; H, 8.65.

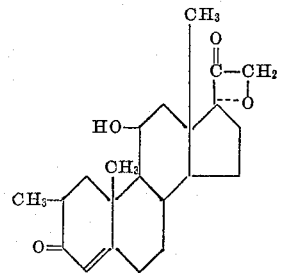

EXAMPLE 6

$2\alpha$ - methyl - 21 - fluoro - 17$\alpha$ - hydroxy - 4 - pregnene-3,11,20 - trione ($2\alpha$ - methyl - 21 - fluoro - 21 - desoxycortisone) (IV)

Following the procedure indicated in Example 5, substitution of $2\alpha$-methyl-21-iodo-17$\alpha$-hydroxy-4-pregnene-3,11,20-trione (III) for the starting material therein is productive of the corresponding 11-keto-21-fluoro steroid, $2\alpha$ - methyl - 21 - fluoro - 17$\alpha$ - hydroxy - 4 - pregnene-3,11,20-trione (IV).

EXAMPLE 7

2α - methyl - 9α,21 - difluoro - 11β,17α - dihydroxy - 4-pregnene - 3,20 - dione (2α - methyl - 9α,21 - difluoro-21-desoxyhydrocortisone) (IV)

A solution of 1.80 grams (3.56 millimoles) of 2α-methyl - 9α - fluoro - 21 - iodo - 11β,17α - dihydroxy - 4-pregnene-3,20-dione (III) in 75 milliliters of acetonitrile was heated and then cooled to forty degrees centigrade. The mixture was protected from light and two 1.5-milliliter portions and one 0.6-milliliter portion of fifty percent aqueous silver fluoride solution were added in that order at one-hour intervals. The temperature was maintained at approximately forty degrees centigrade and stirring was continued to a total reaction time of four hours. The dark mixture was then concentrated at reduced pressure nearly to dryness and the residue extracted successively with three 50-milliliter portions of warm methylene chloride and two 50-milliliter portions of warm acetone. Evaporation of the acetone left only a trace of residue which was discarded. The methylene chloride extract was chromatographed on 75 grams of Florisil. The column was then eluted with 1000 milliliters of twelve percent acetone-88 percent Skellysolve B, 1400 milliliters of fifteen percent acetone-85 percent Skellysolve B, 800 milliliters of twenty percent acetone-eighty percent Skellysolve B and 200 milliliters of acetone. The eluate was collected in 200-milliliter fractions and evaporated. Fractions 5 through 8 contained 0.35 gram of crystalline material which was recrystallized from acetone to yield 0.23 gram as shiny plates melting at 260 to 264 degrees centigrade (with decomposition). Analyses gave the following results:

$\lambda^{Nujol}_{maximum}$ 3420 centimeters$^{-1}$, 3320 centimeters$^{-1}$, 1725 centimeters$^{-1}$, 1653 centimeters$^{-1}$ and 1633 centimeters$^{-1}$.

Calculated for $C_{22}H_{30}O_4F_2$: C, 66.64; H, 7.62; F, 9.58. Found: C, 66.93; H, 8.03; F, 10.17.

EXAMPLE 8

2α - methyl - 9α,21 - difluoro - 17α - hydroxy - 4 - pregnene-3,11,20 - trione (2α - methyl - 9α,21 - difluoro-21-desoxycortisone) (IV)

Following the procedure of Example 7 but substituting 2α - methyl - 9α - fluoro - 21 - iodo -17α - hydroxy - 4-pregnene-3,11,20-trione (III) as the starting material, there is produced the corresponding 11-keto-9α,21-difluoro steroid, 2α-methyl-9α,21-difluoro-17α-hydroxy-4-pregnene-3,11,20-trione (IV).

In the same manner as shown in Examples 5, 6, 7, and 8, and substituting other 2α-substituted-11-oxygenated-21-iodo-17α-hydroxy-4-pregnene-3,11,20-triones, the corresponding 2α-substituted-11-keto-21-fluoro steroids are produced wherein the 2α-substituent is methyl, ethyl, propyl, isopropyl, butyl, isobutyl, pentyl, hexyl, benzyl, phenyl, etc., wherein the 9α-position is occupied either by hydrogen or a halogen atom and wherein the 11-substituent is hydroxy or keto.

It is to be understood that the invention is not to be limited to the exact details of operation or exact compounds shown and described, as obvious modifications and equivalents will be apparent to one skilled in the art; the invention is therefore to be limited only by the scope of the appended claims.

We claim:
1. 2α - methyl - 9α - halo - 21 - fluoro - 11β,17α - dihydroxy-4-pregnene-3,20-dione.
2. 2α - methyl - 9α,21 - difluoro - 11β,17α - dihydroxy-4-pregnene-3,20-dione.
3. 2α - methyl - 9α,21 - difluoro - 17α - hydroxy - 4-pregnene-3,11,20-trione.
4. 2α - methyl - 11β,17α,21 - trihydroxy - 4 - pregnene-3,20-dione 21-methanesulfonate.
5. 2α - methyl - 17α,21 - dihydroxy - 4 - pregnene-3,11,20-trione 21-methanesulfonate.
6. 2α - methyl - 9α - fluoro - 11β,17α,21-trihydroxy-4-pregnene-3,20-dione 21-methanesulfonate.
7. 2α - methyl - 9α - fluoro - 17α,21 - dihydroxy - 4-pregnene-3,11,20-trione 21-methanesulfonate.

References Cited in the file of this patent
UNITED STATES PATENTS 2,903,449     Fried et al. _____ Sept. 8, 1959

OTHER REFERENCES

Hogg et al.: J.A.C.S. 77, Dec. 5, 1955, pp. 6401–6402.
Tannhauser et al.: J.A.C.S. 1956, 78, 2658.
Herz et al.: J.A.C.S 1956, 78, 4812